United States Patent [19]

Tamura

[11] Patent Number: 4,537,307

[45] Date of Patent: Aug. 27, 1985

[54] DAYLIGHT FILM LOADING METHOD AND APPARATUS, FILM AND FILM PACKAGE USED FOR SAME

[75] Inventor: Kaoru Tamura, Kanagawa, Japan

[73] Assignee: Fuji Photo Film Co., Ltd., Japan

[21] Appl. No.: 523,319

[22] Filed: Aug. 15, 1983

[30] Foreign Application Priority Data

| | | | |
|---|---|---|---|
| Aug. 16, 1982 | [JP] | Japan | 57-141976 |
| Aug. 16, 1982 | [JP] | Japan | 57-141977 |
| Aug. 16, 1982 | [JP] | Japan | 57-141978 |

[51] Int. Cl.$^3$ ...................... B65D 85/62; B65D 85/30; B65D 85/48; G03B 19/10

[52] U.S. Cl. .................................... 206/455; 206/449; 206/454; 271/145; 354/174; 354/275; 354/276; 430/496

[58] Field of Search ............... 206/449, 455, 456, 454; 271/145; 354/174, 275, 276; 430/496

[56] References Cited

U.S. PATENT DOCUMENTS

| | | | |
|---|---|---|---|
| Re. 30,792 | 11/1981 | Schmidt | 206/455 |
| 691,294 | 1/1902 | Schilz | 206/449 |
| 3,360,258 | 12/1967 | Nix | 206/449 |
| 4,135,800 | 1/1979 | Weidanz et al. | 206/455 |
| 4,158,409 | 6/1979 | Duinker | 206/455 |
| 4,358,012 | 11/1982 | Marsala et al. | 206/449 |

*Primary Examiner*—William T. Dixson, Jr.
*Attorney, Agent, or Firm*—Sughrue, Mion, Zinn, Macpeak, and Seas

[57] ABSTRACT

A film package containing a stack of films provided with a clamp notch at a side edge in a flexible lighttight envelope is held vertically in a lighttight loading chamber. The films are held by a clamp engaging with the notch from outside the film package. The lower end of the envelope is then cut, and the clamp is released from the notch to make the films fall from the envelope. Then, a shutter is closed between the envelope and the films for shielding the films from light.

24 Claims, 27 Drawing Figures

DAYLIGHT FILM LOADING METHOD AND APPARATUS, FILM AND FILM PACKAGE USED FOR SAME

BACKGROUND OF THE INVENTION

1. Field of the Invention

This invention relates to a method of loading sheet-like light-sensitive films such as image recording photographic films or X-ray photographic films into an image recording apparatus, an X-ray image recording apparatus, or the like in a daylight environment, and an apparatus for carrying out the method. This invention also relates to a film and a film package used in the method.

2. Description of the Prior Art

There have heretofore been known various methods of and apparatuses for loading X-ray films or the like into a cassette in a daylight environment. In the conventional techniques, after a film package comprising a lighttight envelope and films contained therein is loaded into a lighttight chamber, the lighttight envelope is separated from the films or the films are drawn out of the lighttight envelope. However, these techniques have drawbacks in that the construction of the loading apparatus becomes complicated and that there is a risk of the films being damaged.

For example, Japanese Patent Publication No. 52(1977)-23553 discloses a method wherein specific films are enveloped in a film package as alternately reversed in direction, the package envelope is separated from the films by use of a specific dispenser, and then the films are taken out one by one. Further, Japanese Unexamined Patent Publication No. 54(1979)-43328 discloses a cassette magazine wherein a lighttight envelope is drawn out of a film package in a film cassette, and only the films are left in the cassette. However, these techniques require a mechanism for separating the lighttight envelope from the films. On the other hand, in a method disclosed in Japanese Patent Publication No. 56(1981)-41983, a package is introduced into a package receiver connected on a dispenser positioned on a cassette, the lower end of the package is held by a rod from outside thereof to support the films contained in the package, the package is then opened and clamping with the rod is released to allow the films to fall into the dispenser. In this method, however, since the films sequentially fall into the dispenser separately from one another, there is a risk of the films being damaged.

SUMMARY OF THE INVENTION

The primary object of the present invention is to provide a method of loading films into a cassette, an image recording apparatus, or the like, in a daylight environment in a simple manner without damaging the films.

Another object of the present invention is to provide an apparatus for carrying out the method.

The specific object of the present invention is to provide a film and a film package used in the method.

The daylight film loading method in accordance with the present invention comprises:

(i) forming a clamp notch in a predetermined position of a side edge of an unexposed light-sensitive film, (ii) forming a film package containing a stack of such notched films in a flexible lighttight envelope, (iii) holding said film package in a vertical position in a loading chamber shielded from light, and holding a stack of said films by a clamp member in engagement with said clamp notch, (iv) opening a lower end of said lighttight envelope and then disengaging said clamp member from said clamp notch, thereby allowing said films to fall from said lighttight envelope, and (v) after said films are completely separated from said lighttight envelope, closing a shutter between said lighttight envelope and said films to shield said films from light.

In the present invention, the clamp notch should preferably be formed in at least two places at approximately symmetrical positions on opposite side edges of each film.

In the present invention, at least one notch is formed at a predetermined position of at least one side edge of each film, and a stack of such films are held from outside the flexible lighttight envelope by engaging the clamp member with the notch. After the lower end of the lighttight envelope is cut, the lighttight envelope is maintained in the held condition, and the clamping of the films is released to allow the films to fall down. Accordingly, the films simultaneously fall down and are not damaged. Further, the construction of the loading apparatus becomes simple.

By "holding the film package in a vertical position" is meant such a manner of holding that, when holding is released, the film package will move by its weight in the direction along the surface of the film package. Namely, "vertical position" embraces not only the position at right angles to the horizontal position but also inclined positions.

After the films are completely separated from the lighttight envelope, a shutter is closed between the lighttight envelope and the films. In this manner, the loading chamber shielded from light is divided into two chambers, and the upper chamber is used to load thereinto the films contained in a lighttight envelope by opening a cover, or the like, of the chamber in a daylight environment. After the films are loaded from the lighttight envelope into the lower chamber, the lower chamber is used to load the films one by one to an image recording position.

The daylight film loading apparatus in accordance with the present invention comprises:

(i) a first lighttight housing provided with an openable cover, (ii) a second lighttight housing provided with a film exit and positioned under said first lighttight housing, (iii) a shutter openably mounted between said first lighttight housing and said second lighttight housing, (iv) a means for holding a stack of notched films contained in a lighttight envelope by engagement with the notch or notches of said films from outside the lighttight envelope in said first lighttight housing, (v) a means for holding said lighttight envelope in said first lighttight housing, and (vi) a means for disengaging said film holding means from said notch or notches of said films and allowing said films to fall from said lighttight envelope into said second lighttight housing.

In the apparatus of the present invention, since the films are unclamped all at one time and allowed to fall from the first housing into the second housing, the films fall simultaneously with one another in the form of a stack and there is no risk of the films being damaged. Namely, the films can be simply loaded into the second housing provided with a film exit without any risk of the films being damaged.

The mechanism for holding the films should preferably be constructed in such a manner that clamp notches are formed in approximately symmetrical positions on opposite side edges of the films, and a pair of clamp members (claws, bars, or the like) are engaged with the notches from outside the lighttight envelope containing the films, thereby to hold the films suspended therefrom. The clamp notches may be formed, for example, one at each side edge of the film in approximately symmetrical positions. Alternatively, one notch may be formed at one side edge of the film, and two notches may be formed at the other side edge of the film one above and the other below the point symmetrical to the aforesaid notch formed at said one side edge. Or, one or more notches may be formed only at one side edge of the film, and the other side edge provided with no notch may be pressed against a flat contact face for holding the film.

The present invention also provides a film for loading in a daylight environment wherein at least one clamp notch is formed at both side edges of an unexposed rectangular light-sensitive film sheet, said notch being adapted for engagement with a clamp member for hanging said light-sensitive film sheet.

In the present invention, the rectangular film sheet embraces not only a film sheet having an exactly rectangular shape but also a film sheet the general shape of which is approximately rectangular. For example, the rectangular film sheet also embraces a film sheet the four corners of which are cut out. Further, it is sufficient that one notch be formed at each side edge of the film. However, two or more notches may be formed at each side edge of the film, and the number of notches may differ between the two side edges. Furthermore, the notches may be formed at any positions insofar as the film can be hung through the engagement of the notches with clamp members.

When the notches of the film are formed in positions asymmetric to each other with respect to a center line of the film parallel or perpendicular to a side edge of the film, it is possible to discriminate the front and back surfaces of the film from each other even from outside the lighttight envelope containing the film. This is advantageous particularly when the film is provided with an emulsion layer only on one surface.

The present invention also provides a film package comprising a flexible lighttight packaging material and a stack of films as described above and, if necessary, a protective sheet, the stack of films and the protective sheet being contained in lighttight condition in said packaging material. The lighttight envelope formed by the packaging material comprises a space portion for containing the films and seal sections for imparting lighttightness to the space portion.

The present invention further provides a film for loading in a daylight environment wherein at least one clamp notch is formed only at one side edge of an unexposed rectangular light-sensitive film sheet, said notch being adapted for engagement with a clamp member for hanging said light-sensitive film sheet.

The present invention also provides a film package comprising a flexible lighttight packaging material and a stack of the films just described above and, if necessary, a protective sheet, the stack of films and the protective sheet being contained in lighttight condition in said packaging material.

The film provided with at least one notch at least one side edge in accordance with the present invention can be loaded in a daylight environment singly or in the form of a film stack. Even when a stack of many films are loaded at one time, the films are not separated from one another when they fall down from the film package and, therefore, the films can be loaded easily without being damaged. (When the light-sensitive film sheet is of a special thick type exhibiting large rigidity, it will sometimes happen that only one such film sheet is contained in a lighttight envelope and handled in this form. Such a case is also embraced within the scope of the present invention.)

As the packaging material, any material that is flexible and has light-shielding property may be used. However, the packaging material should preferably be constituted of a plastic material which is generally used for packing a light-sensitive material and which can form a packaging envelope by heat sealing. Thus, the packaging material may, for example, be polyethylene, polyethylene laminated paper, or aluminium foil laminated paper. The packaging material may be imparted with light-shielding property by dispersing a light-shielding substance such as carbon black in the packaging material, or by applying a coating material containing a binder and a light-shielding substance dispersed therein on the packaging material.

When the film is not so rigid, a protective sheet may be laid on at least one surface of the film so that the film will not be bent when the film is conveyed, handled or hung through the engagement of the film notches with a clamp member. The protective sheet has a size equal to or larger than the film and rigidity higher than the rigidity of the film. The protective sheet is provided with as many notches as those of the film in positions corresponding to those.

The protective sheet may be made of a material of the same type as the material of the paper sheet employed in a conventional package of an X-ray film, a lithographic film, or the like. The protective sheet may also be made of a plastic insofar as it has the same performance as the paper sheet employed in the conventional package. The protective sheet may be separate from the lighttight packaging material, or may be secured to the packaging material so that the protective sheet will not come out together with the films when the films are withdrawn from the packaging material (lighttight envelope).

When the films provided with at least one notch at each side edge are withdrawn from the packaging material, the packaging material is maintained in the held condition, and clamp bar members in engagement with the notches of the films for hanging the films are released from the notches, thereby allowing the films to fall down. (When the films provided with at least one notch only at one side edge are withdrawn from the packaging material, the packaging material is maintained in the held condition, and a clamp bar member in engagement with the notch of the films for hanging the films is released from the notch. In this case, a contact face contacted with the opposite side edge of the film may simultaneously be moved away from the side edge.) In order to facilitate the holding of the packaging material at this stage, clamp holes may be perforated through the seal section of the packaging material which is positioned on the upper side when the packaging material is held in the loading chamber. The clamp holes may have any shape insofar as the packaging material can be clamped with a clamp member.

Further, in order to assure that only the films are removed from the packaging material while the protective sheet is left behind in the packaging material, the size of the protective sheet may be made larger than the size of the films, and the protective sheet may be provided with at least one notch deeper than the notch of the films in the position overlapping the notch of the films. In this case, when the clamp bar member is disengaged from the film notch to allow the films to fall down, it is possible to release only the films from the clamp bar member while the protective sheet is maintained in the condition clamped by the clamp bar member. Alternatively, a widened portion may be formed at the upper end portion of the protective sheet which is positioned on the upper side when the films are hung in the loading chamber, and the protective sheet may be clamped at the widened portion so that only the films will fall down.

DESCRIPTION OF THE PREFERRED EMBODIMENTS

The present invention will hereinbelow be described in further detail with reference to the accompanying drawings.

Figure 1:
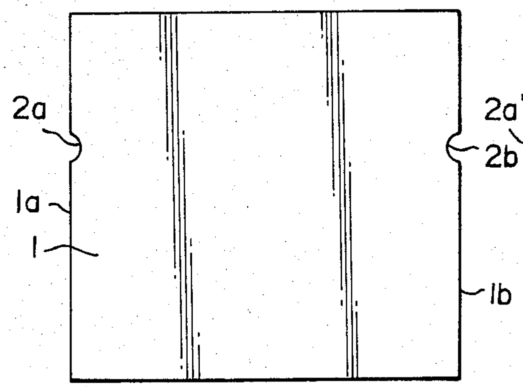
FIGS. 1 to 5 are plan views showing various embodiments of the film for daylight loading in accordance with the present invention.

Referring to FIG. 1 showing an embodiment of the film for daylight loading in accordance with the present invention, clamp notches 2*a* and 2*b* are respectively formed at side edges 1*a* and 1*b* of a rectangular unexposed photographic film sheet 1. The notches 2*a* and 2*b* are formed in such positions that, when clamp bar members or the like are engaged with the notches 2*a* and 2*b*, the sheet 1 can be hung thereby. The notches 2*a* and 2*b* have a size and a shape suitable for securely hanging the sheet 1. By "hanging" is meant not only the case where the sheet 1 is hung exactly vertically but also the case where the sheet 1 is placed, for example, on an inclined surface and supported thereon through the engagement of the notches of the sheet 1 with clamp members such as pins. In many cases, a plurality of film sheets are laid one upon another, and the stack of the film sheets are loaded into a loading chamber. However, it is also possible for only one film sheet to be loaded into a loading chamber at a time in a daylight environment. In the latter case, even when the film sheet is thin and not so rigid, the film sheet can securely be hung if it is placed on an inclined surface and clamped thereon. When an inclined surface is used in this manner, the angle of the inclined surface should preferably be as acute as possible.

Figure 2:
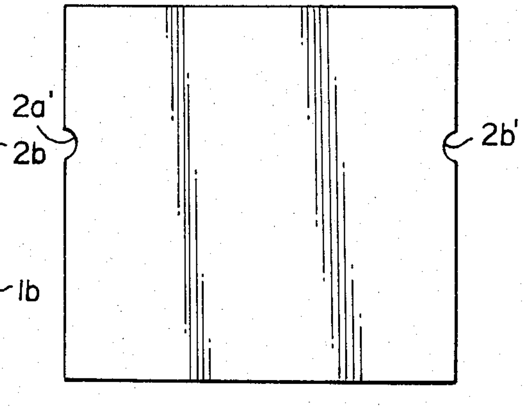
Figure 3:
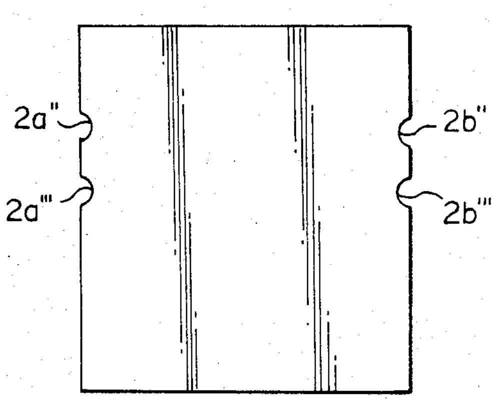
Figure 4:
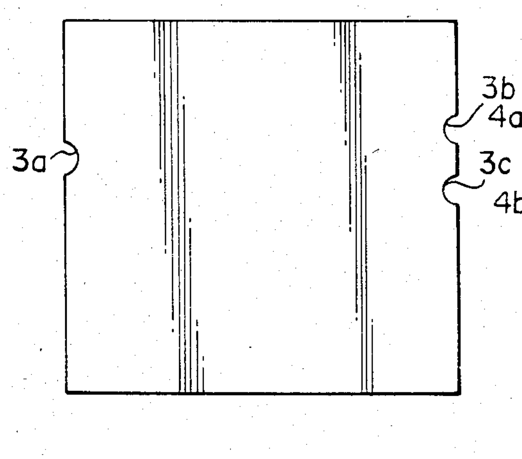
Figure 5:
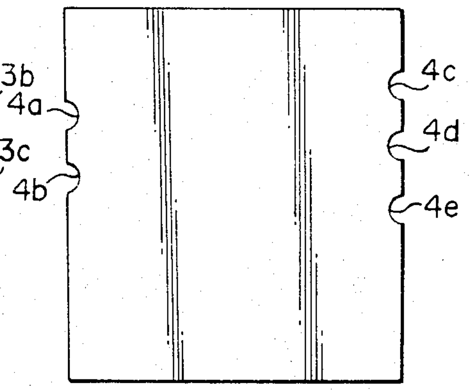

The number and the positions of the notches 2*a* and 2*b* are not limited to the number and positions shown in FIG. 1. For example, as shown in FIG. 2, a notch 2*a'* may be formed at one side edge of a film sheet, and a notch 2*b'* may be formed at the other side edge in a position symmetric with respect to the notch 2*a'*. Further, as shown in FIG. 3, notches 2*a''* and 2*a'''* may be formed at one side edge of a film sheet, and notches 2*b''* and 2*b'''* may be formed at the other side edge in positions symmetric with respect to the notches 2*a'* and 2*a'''*, respectively. Furthermore, as shown in FIG. 4, notches 3*b* and 3*c* may be formed at one side edge of a film sheet, and a notch 3*a* may be formed at the other side edge in a position symmetric with respect to the middle position between the notches 3*b* and 3*c*. Alternatively, as shown in FIG. 5, notches 4*c*, 4*d* and 4*e* may be formed at one side edge of a film sheet, and notches 4*a* and 4*b* may be formed at the other side edge. By increasing the number of notches, it becomes possible to hold a film sheet more securely when the film sheet is hung in a loading chamber.

Figure 6:
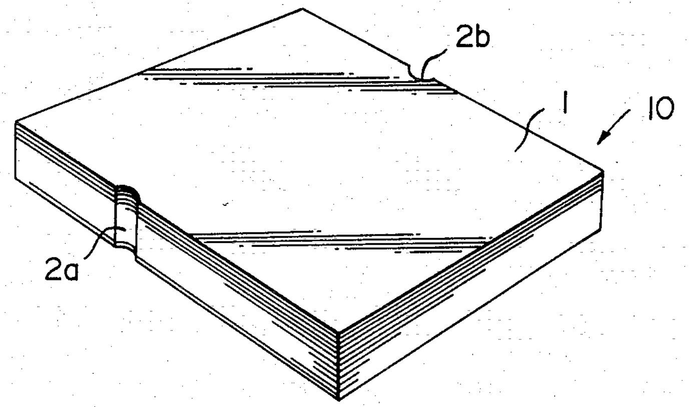
FIG. 6 is a perspective view showing an embodiment of a stack of the films for daylight loading in accordance with the present invention.

When a plurality of film sheets 1 as shown in FIG. 1 are laid one upon another and loaded in the form of a stack, the unexposed film sheets 1 having the same shape and the same size and provided with clamp notches 2*a* and 2*b* in the same positions are laid one upon another to form a film stack 10 as shown in FIG. 6. When the film stack 10 formed in this manner is loaded into a loading chamber, the portions of the notches 2*a* and 2*b* are engaged with clamp bar members extending in the thickness direction of the sheets to hang the sheets 1 in the form of the stack 10. Then, when the clamp bar members are simultaneously disengaged from the portions of the notches *2a* and *2b* in the lighttight loading chamber, the sheets 1 of the stack 10 fall all at one time in the form of the stack 10 into a receiving case. Since the sheets 1 do not separate from one another when they fall into the receiving case, there is no risk of the sheets 1 being damaged.

Figure 7:
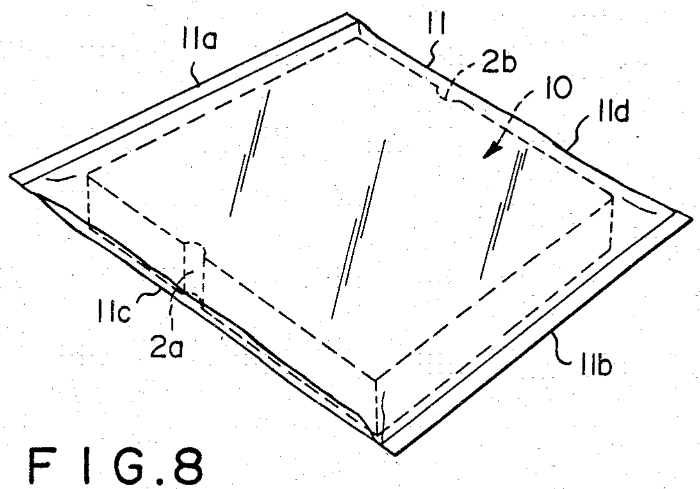
FIG. 7 is a perspective view showing an embodiment of the daylight loading film package in accordance with the present invention.

FIG. 7 shows an embodiment of the film package in accordance with the present invention, wherein the film stack 10 as shown in FIG. 6 is contained in a lighttight condition in a flexible lighttight envelope 11 made of polyethylene or the like. The lighttight envelope 11 is made by heat sealing both end edges 11*a* and 11*b* of a cylindrical polyethylene film. The side portions 11*c* and 11*d* of the lighttight envelope 11 are soft so that, when the side portions ll*c* and ll*d* are held by clamp bar members from the outside thereof, the clamp bar members can sufficiently fit into and engage with the notches *2a* and *2b* at the side edges of the film stack 10.

In the film package shown in FIG. 7, it is possible to hang the film stack 10 as described above by sandwiching the film stack 10 from outside the lighttight envelope 11 by use of the clamp bar members. When the lower end edge of the lighttight envelope 11 is cut while the lighttight envelope 11 is held in the aforesaid condition by an appropriate means, and then the clamp bar members are simultaneously disengaged from the notches *2a* and *2b* of the film stack 10, the film stack 10 falls from the lighttight envelope 11 into a receiving case positioned below the film package. This step is conducted in a condition shielded from light, and then a light-shielding cover is closed on the receiving case to complete film loading in a daylight environment.

Figure 8:
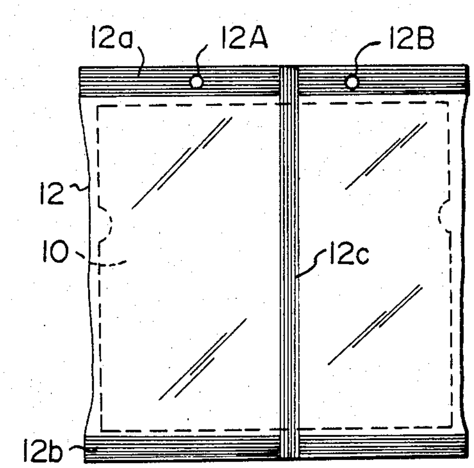
FIG. 8 is a plan view showing another embodiment of the daylight loading film package in accordance with the present invention.

In the film package as described above, in order to facilitate holding of the lighttight envelope 11 when allowing the film stack 10 to fall from the lighttight envelope 11, it is advantageous to form clamp holes at a part, for example, a heat seal portion, of the lighttight envelope 11. FIG. 8 shows such an embodiment of the film package. In the embodiment of FIG. 8, the film stack 10 is contained in a lighttight envelope 12 provided with clamp holes 12A and 12B at a heat seal portion 12*a* at one end edge. The lighttight envelope 12 is made by heat sealing the upper end edge portion 12*a*, a lower end edge portion 12*b* and a middle portion 12*c* of a lighttight film made of polyethylene or the like. In this embodiment, since the lighttight envelope 12 is provided with the clamp holes 12A and 12B, it is possible to hold the lighttight envelope 12 by engaging the clamp holes 12A and 12B with pins or the like of the loading apparatus when making the film stack 10 fall down from the lighttight envelope 12. Therefore, the film stack 10 can be certainly and easily separated from the envelope 12. Further, since the clamp holes 12A and 12B are positioned asymmetrically with respect to the middle portion 12*c* of the envelope 12, it is possible to discriminate the right side of the package from the left side thereof from outside the lighttight envelope 12, and to easily load the package in the correct position of the loading apparatus. Further, when each film is provided with an emulsion layer only on one surface, it is possible to discriminate the emulsion layer side from the back side based on the positions of the clamp holes 12A and 12B.

Figure 8A:
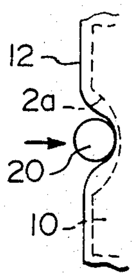
FIG. 8A is an enlarged view showing a part of the film package shown in FIG. 8 together with a clamp member.

FIG. 8A shows the condition of clamping the film package shown in FIG. 8 by use of a clamp bar member 20. The bar member 20 is engaged with the notch *2a* of the film stack 10 contained in the lighttight envelope 12. Since the lighttight envelope 12 is sufficiently flexible, it is deformed along the notch *2a* by the bar member 20, and the bar member 20 can securely hold the film stack 10.

When the film sheets 1 of the film package are not so rigid, a protective sheet may be included in the film package together with the film stack 10 to protect the film sheets 1 from mechanical damage.

FIGS. 9 to 12 show various embodiments of the film package in accordance with the present invention, wherein a protective sheet is contained together with the films.

Figure 9:
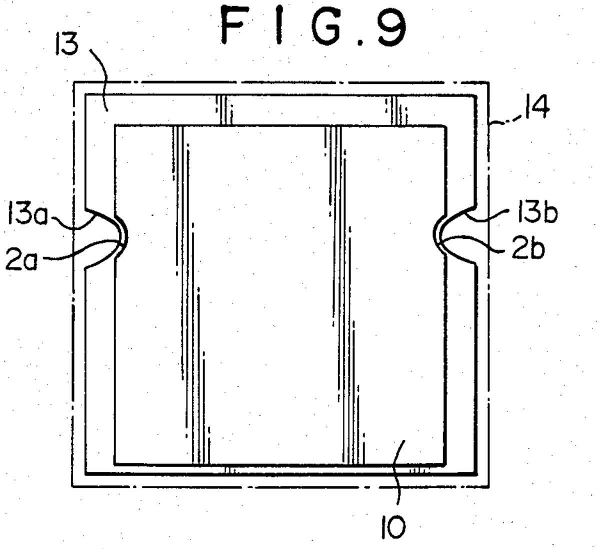
FIG. 9 is a plan view showing a further embodiment of the daylight loading film package in accordance with the present invention.
Figure 9A:
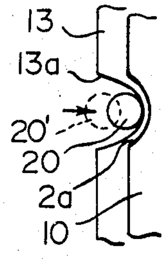
FIG. 9A is an enlarged view showing a part of the film package shown in FIG. 9 together with a clamp member.

In FIG. 9, a protective sheet 13 wider than the film stack 10 and having notches 13*a* and 13*b* deeper than the notches *2a* and *2b* of the film stack 10 is used. As shown in FIG. 9A, when the clamp bar member 20 is moved away from the film stack 10, the clamp bar member 20 is first disengaged from the notch *2a* of the film stack 10. When the clamp bar member 20 moves out to a position 20' indicated by a broken line, the notch *2a* of the film stack 10 is released from the clamp bar member 20, and only the notch 13*a* of the protective sheet 13 remains engaged with the bar member 20. Therefore, the protective sheet 13 is maintained in the clamped position together with the lighttight envelope 14, and only the film stack 10 is allowed to fall.

Figure 10:
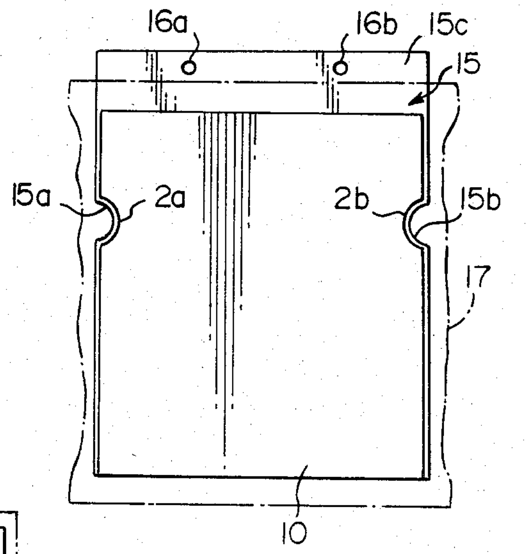
FIGS. 10, 11 and 12 are plan views showing further embodiments of the daylight loading film package in accordance with the present invention.

In FIG. 10, a protective sheet 15 has the same width as the width of the film stack 10 and has notches 15*a* and 15*b* of the same size as the notches *2a* and *2b* of the film stack 10. However, the protective sheet 15 is longer than the film stack 10 and provided with clamp holes 16*a* and 16*b* at a portion 15*c* projected upwardly from the upper end of the film stack 10. The projected portion 15*c* extends beyond the upper end of a lighttight envelope 17 and is secured to the lighttight envelope 17 in the vicinity of the projected portion 15*c*. When clamp bar members are disengaged from the notches *2a* and *2b* of the film stack 10 to make the film stack 10 fall, the clamp bar members also release the protective sheet 15. However, since the protective sheet 15 is clamped by pins or the like of the loading apparatus which engage with the clamp holes 16*a* and 16*b* of the protective sheet 15 and the lighttight envelope 17 is secured to the protective sheet 15, only the film stack 10 falls and is separated from the lighttight envelope 17 and the protective sheet 15.

Figure 11:
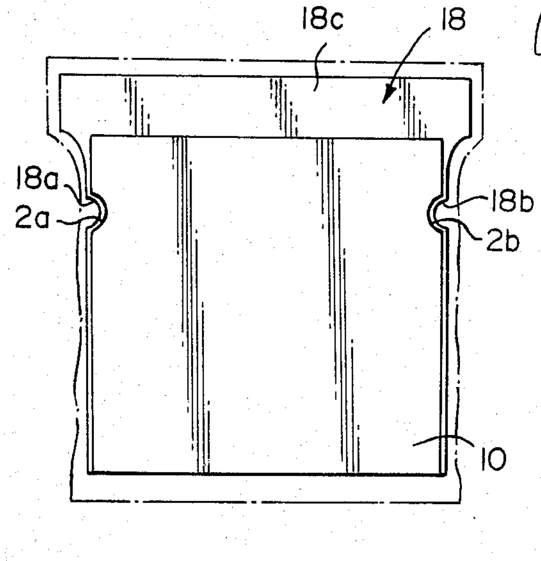

In FIG. 11, a protective sheet 18 has a widened portion 18*c*, which is wider than the film stack 10, at the upper end edge portion. In this embodiment, when clamp bar members are disengaged from the notches 18*a* and 18*b* of the protective sheet 18 (and also from the notches *2a* and *2b* of the film stack 10), the widened portion 18*c* engages with the clamp bar members and prevents the protective sheet 18 from falling.

Figure 12:
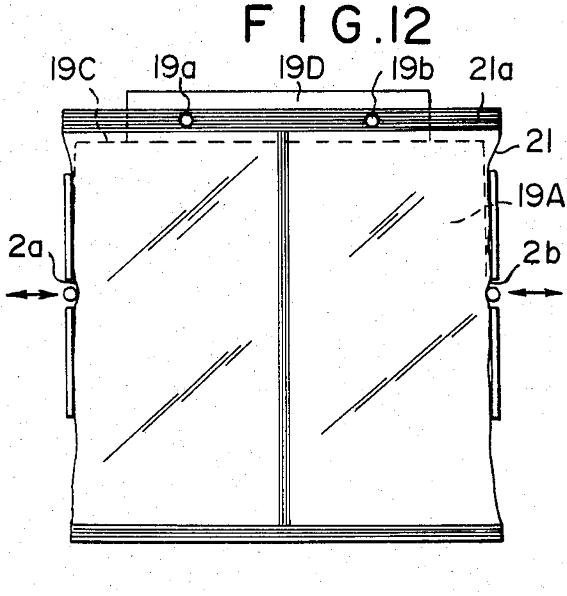
Figure 12A:
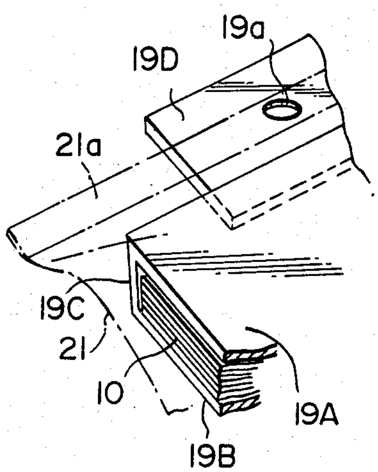
FIG. 12A is an enlarged view showing a part of the film package shown in FIG. 12.

In FIG. 12, a pair of protective sheets 19A and 19B sandwiching the film stack 10 from the front side and the rear side of the film stack 10 are joined at the upper ends to form a U-shaped cross-section as shown in FIG. 12A. A projected portion 19D is secured to the middle of the upper end connecting portion 19C. The projected portion 19D is secured to an upper end edge seal portion 21*a* of the lighttight envelope 21 and provided with clamp holes 19*a* and 19*b*. In this embodiment, clamp holes 19*a* and 19*b* are perforated through the upper end edge seal portion 21*a* of the lighttight envelope 21 and also through the projected portion 19D of the protective sheets 19A and 19B. The lighttight envelope 21 and the protective sheets 19A and 19B are held by clamp members engaging with the clamp holes 19*a* and 19*b*.

Figure 13:
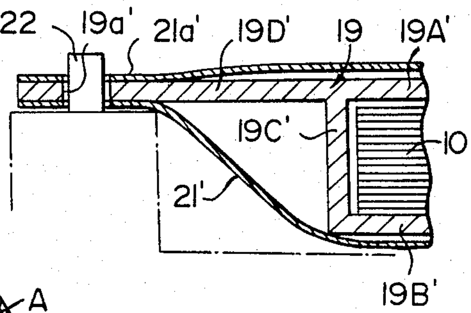
FIG. 13 is a partial enlarged view showing a modified form of the film package shown in FIG. 12.

FIG. 13 shows a modified form of the film package shown in FIG. 12. In FIG. 13, protective sheets 19A' and 19B' are joined with each other at a connecting portion 19C'. A projected portion 19D' is formed by elongating the protective sheet 19A'. The projected portion 19D' is secured to a seal portion 21*a*' of a lighttight envelope 21', and a clamp hole 19*a*' is perforated through the projected portion 19D' and the seal portion 21*a*'. In FIG. 13, a clamp pin 22 for engagement with the clamp hole 19*a* is also shown.

Figure 14:
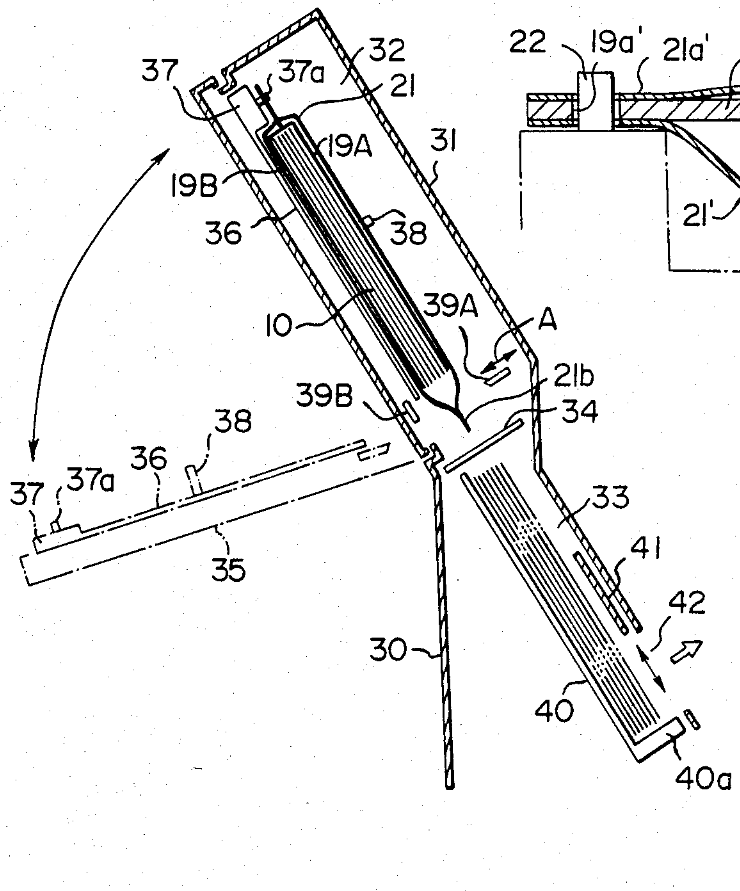
FIG. 14 is a sectional side view showing an embodiment of the daylight film loading apparatus using the film package of FIG. 12 in accordance with the present invention.

FIG. 14 shows an embodiment of the daylight film loading apparatus in accordance with the present invention, wherein the film package shown in FIG. 12 is used.

In FIG. 14, a cover 31 of a light-sensitive film loading section is positioned at a part of a housing 30 on the side of an apparatus, for example, an X-ray image recording apparatus when the light-sensitive film is an X-ray film, or an image recording apparatus (for example, an apparatus using a scanning laser beam) when the light-sensitive film is a light-sensitive recording film for image recording. The housing 30 is divided by a shutter 34 into a film package loading chamber 32 at the upper section and a film receiving chamber 33 at the lower section. The film package loading chamber 32 is provided with an openable light-shielding cover 35, and a film package supporting base 36 is positioned on the inner surface of the light-shielding cover 35. At a portion of the supporting base 36 which is positioned on the upper side when the light-shielding cover 35 is closed, a clamp section 37 provided with a pair of clamp pins 37*a* is formed. On the right and left sides of the middle portion of the supporting base 36 are provided a pair of clamp bars 38 capable of symmetrically moving in the inward-outward direction. The pair of clamp pins 37*a* are used for engagement with the pair of clamp holes 19*a* and 19*b*, and the pair of clamp bars 38 are used for engagement with the notches 2*a* and 2*b* at the right and left side edges of the film stack 10. At the lower section of the film package loading chamber 32 are positioned an upper blade 39A and a lower blade 39B of a cutter for cutting the lower end edge 21*b* of the lighttight envelope 21. The upper blade 39A is movable in the direction of the arrow A. The lower blade 39B is stationary and secured to the inner surface of the light-shielding cover 35.

The shutter 34 is openably mounted between the upper chamber 32 and the lower chamber 33, and can be moved an angle normal to the drawing sheet in FIG. 14. A tray 40 is positioned in the film receiving chamber 33, and a film exit 42 provided with an openable window 41 is positioned on the forward side of the lower section of the tray 40. The tray 40 positioned below the film package loading chamber 32 is used to receive the film stack 10 falling from the lighttight envelope 21 in the loading chamber 32.

Operations of the apparatus shown in FIG. 14 for daylight loading will now be described below.

First, the light-shielding cover 35 of the film package loading chamber 32 is opened, and a film package is placed on the film package supporting base 36 positioned on the inner surface of the light-shielding cover 35. At this time, the clamp holes 19*a* and 19*b* perforated through the projected portion 19D of the protective sheets 19A and 19B are engaged with the pair of clamp pins 37*a* formed on the inner surface of the light-shielding cover 35. Further, the clamp bars 38 positioned on both sides of the film package are moved inwardly for engagement with the notches 2*a* and 2*b* of the film stack 10 and the protective sheets 19A and 19B. Then, the light-shielding cover 35 is closed and locked. In this manner, the film package is positioned in the film package loading chamber 32 in the condition shielded from light as shown in FIG. 14.

Thereafter, the upper blade 39A of the cutter is moved in the direction of the arrow A to cut the lower end edge 21*b* of the lighttight envelope 21 in cooperation with the lower blade 39B. At this time, since the film stack 10 is held in a position higher than the cutter by engagement of the notches 2*a* and 2*b* with the clamp bars 38, there is no risk of the films being cut by the cutter. Then, the shutter 34 is opened, and the clamp bars 38 are moved away from the film stack 10 to release the film stack 10. Therefore, the whole film stack 10 falls into the tray 40 at one time and is held therein, as shown by the chain lines in FIG. 14.

Then, the shutter 34 is closed, and the film loading in a daylight environment is completed. The light-shielding cover 35 is opened, and the empty lighttight envelope 21 and the protective sheets 19A and 19B are taken out of the film package loading chamber 32. The openable window 41 of the film receiving chamber 33 is then opened, and the film sheets are fed one by one through the film exit 42 by a sheet feeding device using, for example, a sucker, and used for image recording.

When or before the film receiving chamber 33 runs out of film sheets, another film package is loaded into the film package loading chamber 32. By repeating the operations mentioned above, it is possible to always have a film package standing by and to efficiently load the films.

In the embodiments described above, at least one notch is formed at each side edge of the film. However, it is also possible to form at least one notch only at one side edge of the film. Embodiments of the present invention wherein at least one notch is formed only at one side edge of the film will now be described below with reference to FIGS. 15 to 24.

Figure 15:
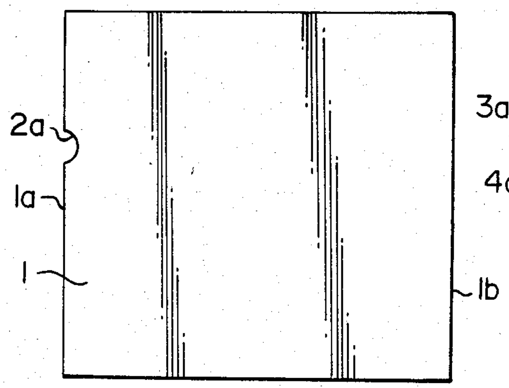
FIGS. 15 and 16 are plan views showing further embodiments of the film for daylight loading in accordance with the present invention.

In FIG. 15, a clamp notch 2*a* is formed at a side edge 1*a* of a rectangular unexposed photographic film sheet 1. The notch 2*a* has a size and a shape suitable for hanging the sheet 1 when the notch 2*a* is engaged with a clamp bar member or the like and the opposite side edge 1*b* of the sheet 1 is contacted with a contact face.

Figure 16:
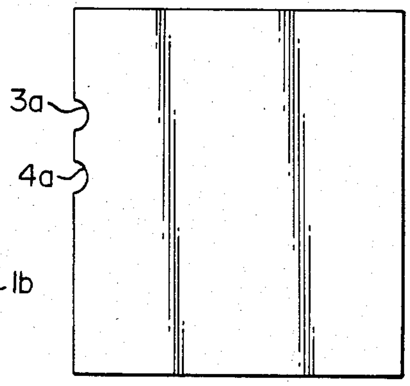

The number and the positions of the notches are not limited to the number and position shown in FIG. 15. For example, notches 3*a* and 4*a* may be formed on one side edge of the sheet as shown in FIG. 16. By increasing the number of notches, it becomes possible to more securely hold the film sheet when it is hung in a loading chamber.

Figure 17:
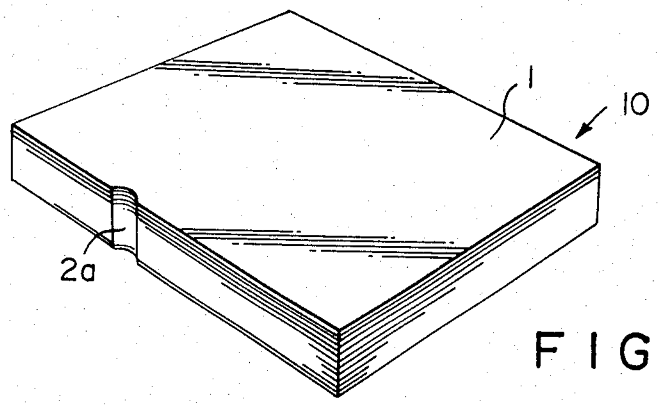
FIG. 17 is a perspective view showing another embodiment of a stack of the films for daylight loading in accordance with the present invention.
Figure 18:
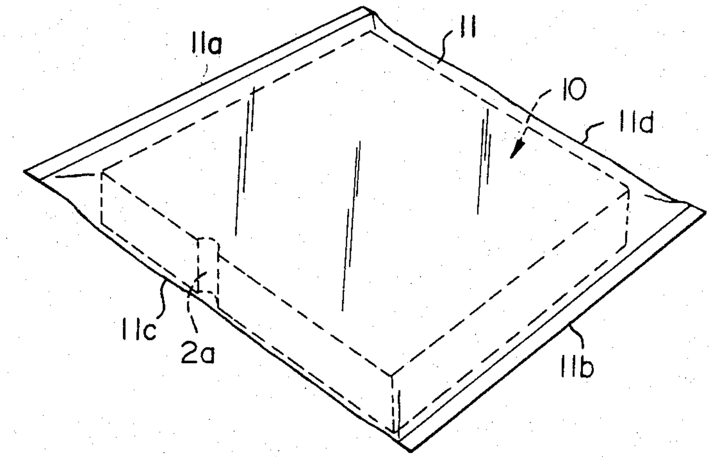
FIG. 18 is a perspective view showing a further embodiment of the daylight loading film package in accordance with the present invention.

FIG. 17 shows a stack 10 of the film sheets 1 as shown in FIG. 15, which is formed by laying the film sheets 1 one upon another in the same manner as described with reference to FIG. 6. FIG. 18 shows an embodiment of the daylight loading film package which is similar to the embodiment of FIG. 7, except that the film sheets of the film stack 10 have a notch 2*a* only at one side edge. In the film package of FIG. 18, it is possible to hang the film stack 10 by engaging a clamp bar member with the notch 2*a* formed at one side edge of the film stack 10 from outside the lighttight envelope 11 and contacting a contact member with the opposite side edge of the film stack 10.

Figure 19:
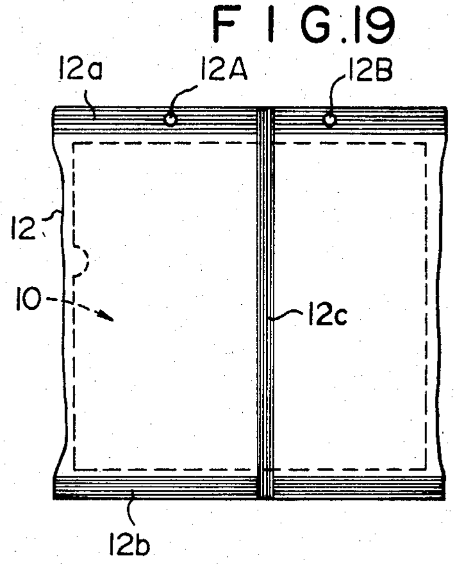
FIG. 19 is a plan view showing a still further embodiment of the daylight loading film package in accordance with the present invention.

FIG. 19 shows a further embodiment of the daylight loading film package in accordance with the present invention, which is similar to the embodiment shown in FIGS. 8 and 8A, except that the film stack 10 of the film package has the notch only at one side edge.

Figure 20:
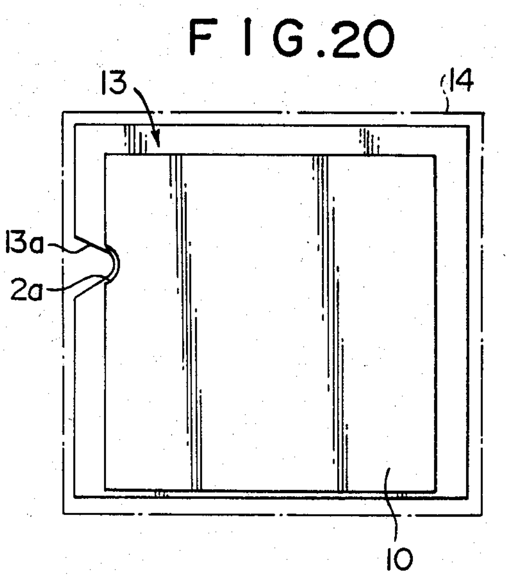
FIG. 20 is a plan view showing another embodiment of the daylight loading film package in accordance with the present invention.
Figure 21:
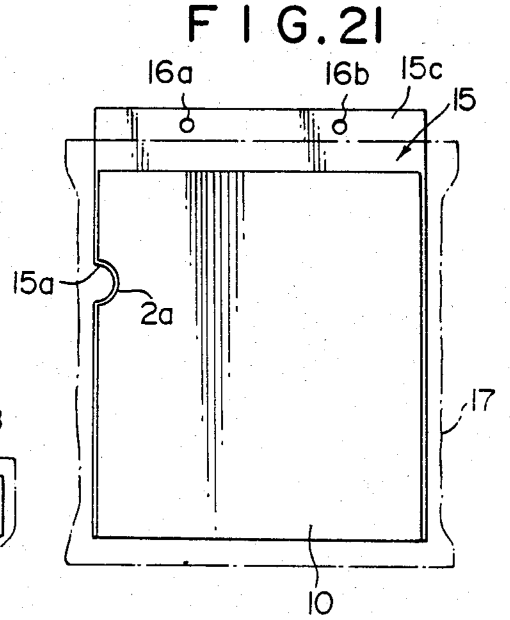
FIGS. 21, 22 and 23 are plan views showing further embodiments of the daylight loading film package in accordance with the present invention.
Figure 22:
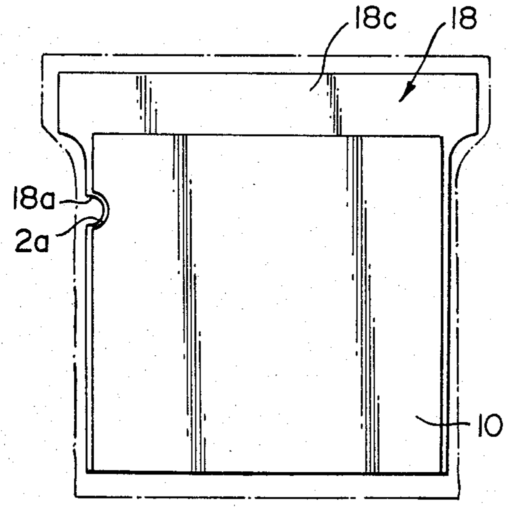
Figure 23:
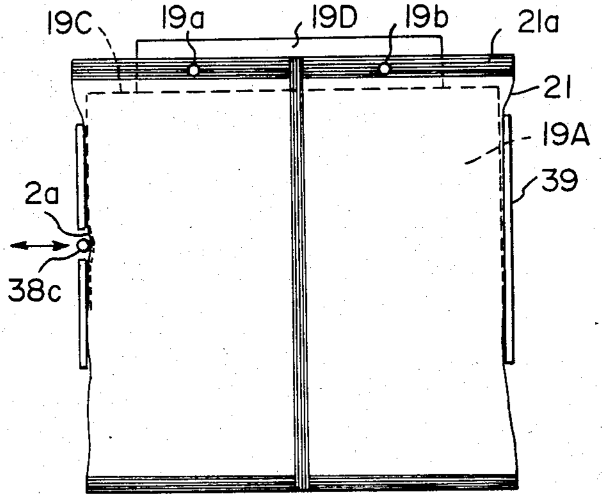

Embodiments of the daylight loading film package shown in FIGS. 20, 21 and 22 are similar to the embodiments of FIGS. 9, 10 and 11, respectively, except that the film stack 10 and the protective sheets 13, 15 and 18 have the notch only at one side edge. An embodiment of the daylight loading film package shown in FIG. 23 is similar to the embodiment of FIGS. 12 and 12A, except that the film stack 10 and the protective sheets 19A and 19B have the notch only at one side edge and a contact plate 39 is contacted with the other side edge. The embodiment shown in FIG. 23 may be modified as shown in FIG. 12.

Figure 24:
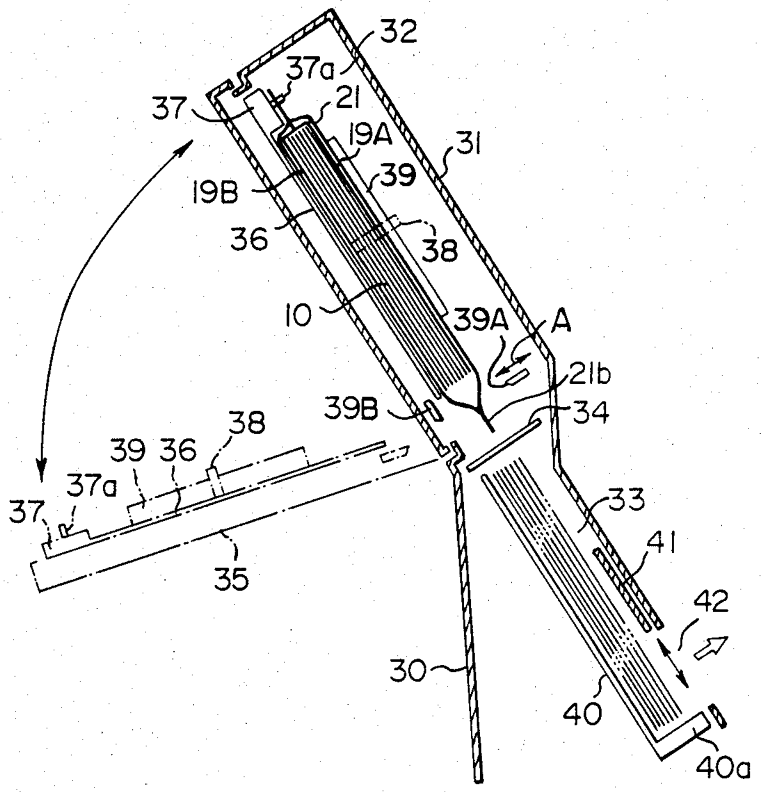
FIG. 24 is a sectional side view showing an embodiment of the daylight film loading apparatus using the film package of FIG. 23 in accordance with the present invention.

FIG. 24 shows another embodiment of the daylight film loading apparatus in accordance with the present invention, wherein the film package shown in FIG. 23 is used. The embodiment of FIG. 24 is similar to the embodiment shown in FIG. 14, except that the clamp bar 38 capable of moving in the inward-outward direction is positioned only on the left side of the middle portion of the supporting base 36, and a contact plate 39 capable of moving in the inward-outward direction is positioned on the right side of the middle portion of the supporting base 36. The clamp bar 38 is used for engagement with the notch 2*a* formed at the left side edge of the film stack 10, and the contact plate 39 is used for contacting the right side edge of the film stack 10.

It should be understood that the present invention can be embodied in various ways other than the above described embodiments. For example, the lighttight envelope need not necessarily be sealed at the upper and lower end portions insofar as the film stack is contained therein in lighttight condition. Thus, the lower end portion of the lighttight envelope may be folded. In this case, when the film package is hung in the lighttight chamber, the lower end portion of the lighttight envelope opens naturally to allow the film stack to fall. In this case, the cutter for cutting the lower end portion of the lighttight envelope becomes unnecessary, and the construction of the loading apparatus becomes simpler.

I claim:

1. A daylight film loading method comprising:
(i) forming a clamp notch in a predetermined position of a side edge of an unexposed light-sensitive film,
(ii) forming a film package containing a stack of such notched films in a flexible lighttight envelope,
(iii) holding said film package in a vertical position in a loading chamber shielded from light, and holding the stack of said films by a clamp member in engagement with said clamp notch,
(iv) opening a lower end of said lighttight envelope and then disengaging said clamp member from said clamp notch, thereby allowing said films to fall from said lighttight envelope, and
(v) after said films are completely separated from said lighttight envelope, closing a shutter between said lighttight envelope and said films to shield said films from light.

2. A method as defined in claim 1 wherein two or more of said clamp notches are formed at approximately symmetrical positions on opposite side edges of said films, clamp members are urged against the film side edges so as to sandwich said films from both side edges and, when said clamp members are released, said clamp members are simultaneously disengaged from the clamp notches of said films.

3. A daylight film loading apparatus comprising:
(i) a first lighttight housing provided with an openable cover,
(ii) a second lighttight housing provided with a film exit and positioned under said first lighttight housing,
(iii) a shutter openably mounted between said first lighttight housing and said second lighttight housing,
(iv) a means for holding a stack of notched films contained in a lighttight envelope by engagement with a notch of said films from outside the lighttight envelope in said first lighttight housing,
(v) a means for holding said lighttight envelope in said first lighttight housing, and
(vi) a means for disengaging said film holding means from said notch of said films and allowing said films to fall from said lighttight envelope into said second lighttight housing.

4. An apparatus as defined in claim 3 wherein two or more of said notches are formed in approximately symmetrical positions on opposite side edges of said films, and said film holding means comprises a pair of clamp members for engagement with the notches from both side edges of said films.

5. A film package for loading in a daylight environment comprising an unexposed rectangular light-sensitive film sheet provided with at least one clamp notch at each side edge, or a sheet stack of a plurality of such film sheets laid one upon another by aligning the corresponding notch positions with one another, and a flexible lighttight packaging material containing said film sheet or said sheet stack in lighttight condition, said film package being adapted for hanging said film sheet or said sheet stack by engagement of said notches with clamp members from outside said packaging material.

6. A film package as defined in claim 5 wherein the at least one clamp notch formed at each side edge of said film sheet is at a position approximately symmetrical with respect to the at least one clamp notch formed at the other side edge of said film sheet.

7. A film package as defined in claim 6 wherein a single clamp notch is formed at each of the symmetrical positions on opposite side edges of said film sheet.

8. A film package as defined in claim 5 wherein at least two clamp notches are formed at one side edge of said film sheet, and a single clamp notch is formed at the other side edge in a position approximately symmetric with respect to the middle position between the two adjacent notches formed at said one side edge.

9. A film package as defined in claim 8 wherein two clamp notches are formed at one side edge of said film sheet, and a single clamp notch is formed at the other side edge.

10. A film package as defined in claims 5, 6, 7, 8 or 9 wherein said packaging material comprises a space portion for containing said light-sensitive film sheet or said sheet stack and seal portions for imparting lighttightness to said space portion, and clamp holes for hanging are formed at a seal portion of said packaging material which is positioned on the upper side when said packaging material containing said film sheet or said sheet stack is hung.

11. A film package for loading in a daylight environment comprising:
(i) an unexposed rectangular light-sensitive film sheet provided with at least one clamp notch at each side edge, or a sheet stack of a plurality of such film sheets laid one upon another by aligning the corresponding notch positions with one another, (ii) a protective sheet for protecting said film sheet or said sheet stack by covering at least one surface of said film sheet or said sheet stack, which has higher rigidity than the rigidity of said film sheet and has a size at least equal to the size of said film sheet, and which is provided with clamp notches at least at the portions overlapping said clamp notches when laid on said film sheet or said sheet stack, and (iii) a flexible lighttight packaging material containing said film sheet or said sheet stack protected by said protective sheet in lighttight condition, (iv) said film package being adapted for hanging said film sheet or said sheet stack by engagement of said notches of said sheet or said sheet stack and said protective sheet with clamp members from outside said packaging material.

12. A film package as defined in claim 11 wherein the at least one clamp notch formed at each side edge of said film sheet is at a position approximately symmetric with respect to the at least one clamp notch formed at the other side edge of said film sheet or said sheet stack.

13. A film package as defined in claim 12 wherein a single clamp notch is formed at each of the symmetrical positions on opposite side edges of said film sheet or said sheet stack.

14. A film package as defined in claim 11 wherein at least two clamp notches are formed at one side edge of said film sheet or said sheet stack, and a single clamp notch is formed at the other side edge in a position approximately symmetric with respect to the middle position between the two adjacent notches formed at said one side edge.

15. A film package as defined in claim 14 wherein two clamp notches are formed at one side edge of said film sheet or said sheet stack, and a single clamp notch is formed at the other, side edge.

16. A film package as defined in claims 11, 12, 13, 14 or 15 wherein at least a part of said protective sheet is secured to said packaging material.

17. A film package as defined in claims 11, 12, 13, 14 or 15 wherein said packaging material comprises a space portion for containing said light-sensitive film sheet or said sheet stack protected by said protective sheet and seal portions for imparting lighttightness to said space portion, and clamp holes for hanging are formed at a seal portion of said packaging material which is positioned on the upper side when said packaging material containing said film sheet or said sheet stack is hung.

18. A film package as defined in claims 11, 12, 13, 14, 15, 16 or 17 wherein the upper end portion of said protective sheet which is positioned on the upper side when said packaging material containing said film sheet or said sheet stack protected by said protective sheet is hung is provided with a portion wider than the other portion of said protective sheet.

19. A film package for loading in a daylight environment comprising an unexposed rectangular light-sensitive film sheet provided with at least one clamp notch only at one side edge, or a sheet stack of a plurality of such film sheets laid one upon another by aligning the corresponding notch positions with one another, and a flexible lighttight packaging material containing said film sheet or said sheet stack in lighttight condition, said film package being adapted for hanging said film sheet or said sheet stack by engagement of said notch with clamp member from outside said packaging material and by contact of a contact face with the side edge opposite to the side edge provided with said notch.

20. A film package as defined in claim 19 wherein said packaging material comprises a space portion for containing said light-sensitive film sheet or said sheet stack and seal portions for imparting lighttightness to said space portion, and clamp holes for hanging are formed at a seal portion of said packaging material which is positioned on the upper side when said packaging material containing said film sheet or said sheet stack is hung.

21. A film package for loading in a daylight environment comprising:

(i) an unexposed rectangular light-sensitive film sheet provided with at least one clamp notch only at one side edge, or a sheet stack of a plurality of such film sheets laid one upon another by aligning the corresponding notch positions with one another, (ii) a protective sheet for protecting said film sheet or said sheet stack by covering at least one surface of said film sheet or said sheet stack, which has higher rigidity than the rigidity of said film sheet and has a size at least equal to the size of said film sheet, and which is provided with a clamp notch at least at the portion overlapping said clamp notch when laid on said film sheet or said sheet stack, and (iii) a flexible lighttight packaging material containing said film sheet or said sheet stack protected by said protective sheet in lighttight condition, (iv) said film package being adapted for hanging said film sheet or said sheet stack by engagement of said notch of said sheet or said sheet stack and said protective sheet with clamp member from outside said packaging material and by contact of a contact face with the side edge opposite to the side edge provided with said notch.

22. A film package as defined in claim 21 wherein at least a part of said protective sheet is secured to said packaging material.

23. A film package as defined in either of claim 21 or 23 wherein said packaging material comprises a space portion for containing said light-sensitive film sheet or said sheet stack protected by said protective sheet and seal portions for imparting lighttightness to said space portion, and clamp holes for hanging are formed at a seal portion of said packaging material which is positioned on the upper side when said packaging material containing said film sheet or said sheet stack is hung.

24. A film package as defined in any of claim 21, 22 or 23 wherein the upper end portion of said protective sheet which is positioned on the upper side when said packaging material containing said film sheet or said sheet stack protected by said protective sheet is hung is provided with a portion wider than the other portion of said protective sheet.

* * * * *